(No Model.)
P. KENNEDY & C. J. DISS.
STORAGE BATTERY.
No. 482,043. Patented Sept. 6, 1892.
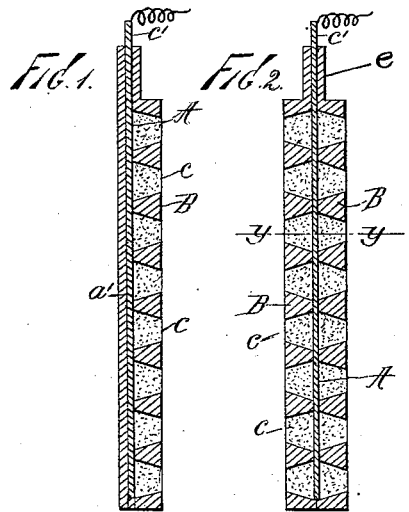
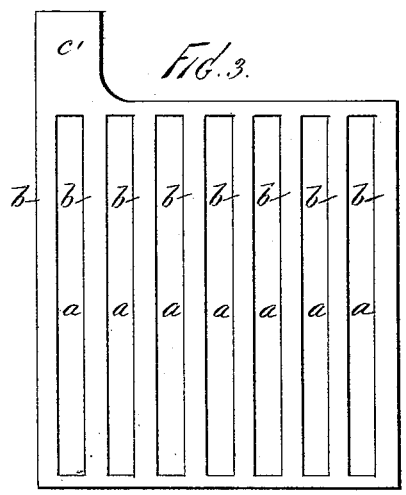
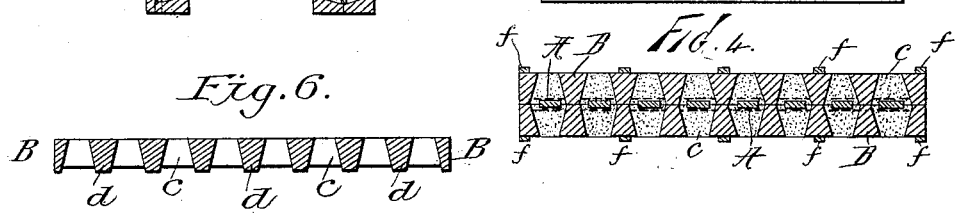
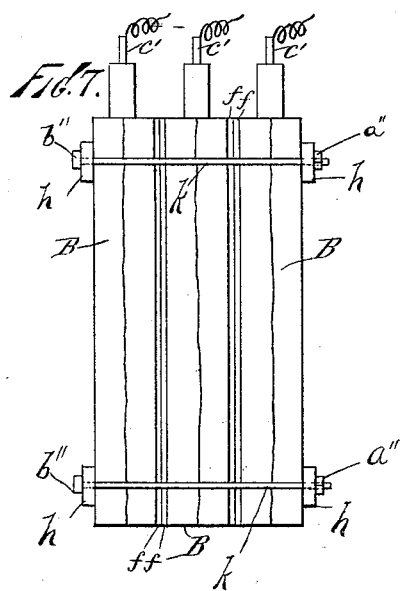
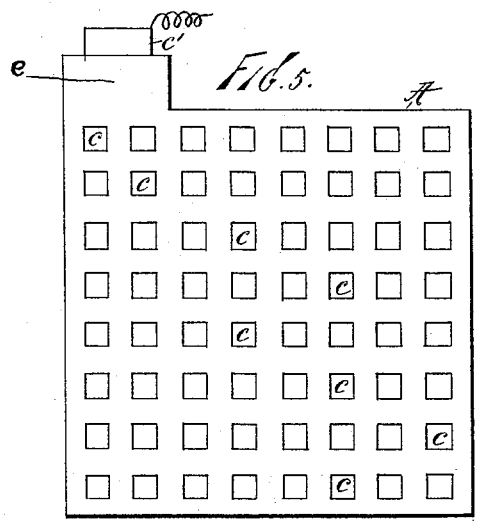
Witnesses
John Buckler,
P. J. Morgan
Inventors
Patrick Kennedy
Charles J. Diss
By their Attorney
James A. Whitney
THE NORRIS PETERS CO., PHOTO-LITHO., WASHINGTON, D. C.

UNITED STATES PATENT OFFICE.

PATRICK KENNEDY AND CHARLES J. DISS, OF BROOKLYN, NEW YORK, ASSIGNORS TO THE ACME STORAGE BATTERY COMPANY, OF WEST VIRGINIA.

STORAGE-BATTERY.

SPECIFICATION forming part of Letters Patent No. 482,043, dated September 6, 1892.

Application filed September 25, 1891. Serial No. 406,802. (No model.)

*To all whom it may concern:*

Be it known that we, PATRICK KENNEDY and CHARLES J. DISS, citizens of the United States, residing at Brooklyn, in the county of Kings and State of New York, have invented certain new and useful Improvements in Storage-Batteries, of which the following is a specification.

The object of our invention is to provide a storage-battery which will be much lighter than those heretofore commonly in use, which will be more efficient in proportion to the quantity of active material employed, which will retain the respective parts of the apparatus in their due position with regard to each other with greater certainty and security, and which will be capable of production and use at less expense than has heretofore been generally obtained in the art.

Our said invention depends for its operation upon the support of the active material in due connection with a conductor of electricity by means of devices composed of material or materials which are substantially or practically in such relation non-conductors of electricity, thereby dispensing with electrically-conducting metallic plates constructed with cavities for holding the active material.

Our said invention comprises certain novel combinations of parts whereby the aforesaid principle of construction and operation is very effectually carried into effect and whereby we obtain the practical advantages just hereinbefore set forth.

Figure 1 is a transverse sectional view of an apparatus embodying certain features of our said invention. Fig. 2 is a sectional view corresponding to Fig. 1, but including additional features of our said invention. Fig. 3 is a detail view of the conductor. Fig. 4 is a transverse sectional view taken in the line $y$ $y$ of Fig. 2. Fig. 5 is a side view of the apparatus shown in Fig. 2. Fig. 6 is a cross-section of one of the structures B, having ribs $d$ provided thereon. Fig. 7 is an end view showing the collocation of a number of said apparatuses as assembled and connected for use in a cell of a storage-battery.

A is a conductor of electricity. The shape and proportions of this conductor may be varied within wide limits, it being sufficient if it be adapted to the place, function, and use hereinafter set forth. It may also be of any suitable material; but ordinarily metallic lead, by reason of its cheapness and general efficiency for the purpose, is to be preferred. As represented in the drawings, this conductor A is in the form of a flat sheet slotted as shown at $a$, so that the conductor is composed of a series of flat strips or multiple plates $b$ connected together. Said conductor, as shown in the drawings, is provided with an extension or shank $c'$, to which the usual battery-wires are attached.

The structure or structures for holding the active material are shown at B and are made of any suitable non-conducting material. They may be of glass, vulcanized india-rubber, bituminous material of suitable strength, stiffness, and cohesion, or of any other material which is substantially a non-conductor of electricity, susceptible of being brought to the requisite form and shape, and capable of resisting to the required or desired degree the chemical action of the liquid in the cell of the battery. We prefer, however, to use for the purpose a material composed of one part, by weight, of shellac incorporated with five parts, by weight, of finely-pulverized or floured glass, which, so far as we are at present aware, provides, all things considered, the best material for the structure or structures aforesaid.

As we have set forth and claimed a structure made of the material composed substantially as just herein specified in a certain other application for Letters Patent filed by us on the 25th day of September, 1891, Serial No. 406,803, we do not for the purposes of this present application claim the same.

Each of said structures, as represented in the drawings, is in the form of a flat plate of any requisite thickness with (formed transversely therein) any desired number of cavities or openings $c$. These cavities are larger at the inner side of the structure—that is to say, at their ends nearest the conductor A—than at their outer ends. Said outer ends are open to afford access of the exciting liquid or electrolyte to the active material.

The conductor A is placed upon the side of the structure B. When desired, only one structure may be used, the side of the conductor opposite that at which the structure is situated being covered by a non-conducting plate $a'$ of any suitable material, as shown in Fig. 1. This, however, is not ordinarily to be preferred in practice, the best results being obtained by placing the conductor A between two of the structures B, as shown in Fig. 2. The active material, of any ordinary or suitable kind—as, for example, red lead—is placed in the cavities or openings $c$, preferably through the open outer ends of said cavities or openings, after the conductor has been secured in place in any suitable manner—as, for instance, by the use of a spatula. The active material when in the cavities must come in contact with the conductor A. The structures B are of course to be duly held in place. To secure this and also to strengthen the structures when the said structures are of a material which assumes a soft and adhesive character when subjected to the action of heat, the inner faces of the structures are provided with ribs $d$, the ribs on the one structure being coincident with those of the other and those at the inner parts of the structures being arranged to meet through the slots in the conductor A. The inner surfaces of the structures being warmed until they become soft and adhesive the structures are placed in the described relation with each other and with the conductor A. The heated and softened surfaces of the ribs of the two structures meet and unite, thus connecting the structures by joints which are practically integral with the structures themselves. Upon each structure is an extension $e$, which coincident with the like extension on the contiguous structure operates with it to protect the shank or extension $c'$ of the conductor from the action of the liquid in the storage-battery cell. In the latter any desired number of the apparatuses are placed side by side and are connected by wires corresponding to the wires of an ordinary storage-battery constructed with the usual leaden plates for holding the active material.

Any desired number of the apparatuses may be placed in the described relation with each other in the battery. Lugs $h$ may be provided to the outermost of said apparatuses placed side by side, and transverse bolts $k$, having suitable heads $a''$ and nuts $b''$, are so connected with said lugs as to hold the apparatuses snugly together.

It will be observed that in our invention the electrical conductivity necessary to the operation of a storage-battery is obtained by means of the conductor A, which is so constructed that substantially its whole conducting portion is kept properly in contact with the active material in the cavities $c$ of the non-conducting structure or structures, while the openings therein provide for the junction and for the connection of the opposing non-conducting structures at those places which are between the cavities thereof.

In our invention we are able to limit the weight of metal to that requisite for purposes of conductivity alone, while the support and retention of the active material are provided for by a structure which is very much lighter than the metal plate of the common storage-battery and for any given rate of power or efficiency proportionately diminishes the weight of the storage-battery.

A further advantage inherent in our said invention is that the structure or structures which hold the active material may be of such composition or substance as will not warp, as is often experienced with the metallic plates of ordinary storage-batteries.

A further advantage is that the "ripening," as it is termed, of the active material when red lead is used for that purpose, under the initial action of the electrical current, and which is essential to the advantageous operation of a storage-battery, is much more complete than is obtained with the usual lead plates of an ordinary storage-battery. In the latter the ripening action is from the circumference inward of each separate mass of active material, and it is found in practice that a central core thereof is for a long time, and often even permanently, left entirely unaffected, of course impairing the working efficiency in a like proportion.

In storage-batteries embracing our said invention the ripening action extends across the entire diameter of each mass of active material and, proceeding from the inner to the outer end thereof, affects all parts thereof alike.

In order to provide for the requisite separation from each other of the apparatuses placed in a battery-cell as aforesaid, there is provided upon the outer side of each of the structures B a number of ridges $f$, which should be so situated as not to interfere with the open ends of the cavities or openings of the said structure. When the apparatuses are placed in a battery-cell, the ridges of the one abut against those of the adjoining apparatuses, and thus keep the apparatuses apart to the extent required for the proper working or operation of the battery.

What we claim as our invention is—

1. In a storage-battery, the combination, with non-conducting structures for holding the active material, of an electrical conductor placed between them and a joint integrally connecting the said structures, substantially as herein set forth.

2. In a storage-battery, the combination of non-conducting structures provided with ribs $d$ and constructed to hold the active material with a slotted electrical conductor placed between said structures, substantially as herein set forth.

3. In a storage-battery, a conductor constructed and arranged for connection with electric wires and having openings therethrough, active material arranged at opposite surfaces of said conductor, and non-conducting structures for containing the active material and for holding the same against the opposite sides of said conductor and constructed to meet at intervals through the openings therein, all substantially as and for the purpose herein set forth.

4. In a storage-battery, a conductor constructed and arranged for connection with electric wires and having openings therethrough, active material arranged at opposite sides thereof, and non-conducting structures composed of material which becomes adhesive when warmed and joined through the openings in the conductor by adhesion, substantially as and for the purpose herein set forth.

5. The combination, with the active material of a storage-battery, of a conductor A, composed of multiple flat strips or plates $b$, connected together with slots $a$ between them and constructed and arranged for connection with suitable electric wires, and non-conducting structures which hold the active material in contact with the strips or plates $b$ and which meet through the slots $a$, all substantially as and for the purpose herein set forth.

6. The combination, with the active material of a storage-battery, of a conductor A, composed of multiple flat strips or plates $b$, connected together with slots $a$ between them and constructed and arranged for connection with suitable electric wires, and non-conducting structures which hold the active material in contact with the strips $b$ and are united through the slots $a$ by adhesion along their length, substantially as and for the purpose herein set forth.

7. In a storage-battery, the combination of non-conducting structures having a series or system of cavities with an interposed conductor constructed for connection with suitable electric wires and having a series or system of openings coincident with the spaces between the cavities of each of the said structures, whereby provision is made for bringing the conductor in contact with the contents of the cavities and for connecting the structures by their contact through the said openings, substantially as and for the purpose herein set forth.

8. In a storage-battery, the combination of non-conducting structures having cavities which are larger at their inner than at their outer ends with a slotted conductor A, the bars $b$ of which lie across the said inner ends of said cavities, while the structures meet and are connected through the slots $a$ of said conductor, substantially as and for the purpose herein set forth.

9. In a storage-battery, the combination of an electrical conductor having a shank or connecting device $c$ with a non-conducting structure for holding the active material and a sleeve extended from said structure to protect said shank or device, substantially as herein set forth.

10. In a storage-battery, a conductor A, composed of connected flat strips or plates $b$, having slots $a$ between them and provided with means for connection with suitable electric wires, in combination with a non-conducting structure having rows of cavities larger at their inner than at their outer ends and arranged coincident with and opposite to the strips or plates $b$, and a non-conducting backing or support at the back of said conductor, all substantially as and for the purpose herein set forth.

PATRICK KENNEDY.
CHARLES J. DISS.

Witnesses:
WILLIAM I. BARKER,
H. CLAY TRUMPER.